Patented June 21, 1938

2,121,215

UNITED STATES PATENT OFFICE 2,121,215

PREPARATION OF TITANIUM OXYGEN COMPOUNDS

Paul Weise and Friedrich Raspe, Leverkusen-I. G. Werk, Germany, assignors to Titangesellschaft M. B. H., Leverkusen-I. G. Werk, Germany, a corporation No Drawing. Application April 12, 1937, Serial No. 136,502. In Germany September 14, 1935

12 Claims. (Cl. 23—202)

This invention relates to the preparation of precipitates by means of hydrolytic decomposition of certain salt solutions. It relates particularly to the precipitation of titanium oxygen compounds from titanium salt solutions.

The present application is a continuation in part of our previous application, Serial No. 55,937, filed December 23, 1935.

An object of the present invention is to provide improved means for obtaining increased yields of hydrous titanium compounds hydrolytically precipitated from titanium salt solutions which, when calcined, possess excellent pigment qualities, such as whiteness and proper particle size. Another object of this invention is to provide means for the control, during precipitation, of the volume and the acid concentration of hydrolyzing solutions, e. g. solutions of titanium such as titanium sulfate solution.

Titanium dioxide, in a form useful in the arts, is usually obtained by boiling solutions of titanium sulfate or chloride to bring about hydrolytic decomposition. Hydrous titanium-oxygen compounds are thus precipitated containing more or less combined and/or adsorbed sulfate or chloride depending upon the solution used for the precipitation. Such compounds are usually referred to as "hydrous titanium oxides". The precipitated hydrous titanium oxides are thoroughly washed and calcined to obtain the desired anhydrous titanium dioxide. Many conditions for precipitation have been proposed in the scientific and patent literature, for example, control of the concentrations and ratios of titanium dioxide and acid per unit volume of solution prior to hydrolysis, addition of so-called "nuclei" to initiate and to accelerate the hydrolysis, etc.

Prior to the present invention it was only possible to obtain yields not substantially greater than 90%, when hydrolyzing a titanium salt solution by simple heating since precipitation ceases at this point regardless of any continued heating or boiling. In fact, not only is continued boiling of the precipitation slurries of no practical use, but it is actually detrimental. If the precipitation slurry is maintained at the boiling point for any appreciable time after active precipitation has ceased, the form of the precipitate changes; it may become coarse, or, in certain cases, it may exhibit colloidal properties becoming difficult to filter and wash. In both cases products are obtained of inferior color and pigment characteristics.

When a titanium solution, for instance a titanium sulfate solution is subjected to boiling, the titanium compounds precipitate in the form of hydrous oxides more rapidly during the initial stages of the hydrolysis and less rapidly as the precipitation nears completion. Coincident with the precipitation of the hydrous titanium oxides the concentration of sulfuric acid, free and combined with titanium per unit volume, is increased so that when about 90% of the titanium has been precipitated active precipitation ceases and continued boiling is ineffectual in obtaining yields above this figure. At the same time, a diminution in the volume of the solution usually occurs due to evaporation, with a further consequent increase in acid concentration.

We have found that it is the increase in acid concentration which not only stops the precipitation at undesirably low yield values but, depending upon the hydrolysis conditions, for example, concentration of titanium, sulfuric acid and other salts present, initially basicity or acidity of the hydrolysis solution, presence of nuclei etc., may actually tend to peptize the hydrated titanium compounds thereby reducing the particle size to such an extent as to make the precipitate difficult, if not impossible to filter and wash effectively; or, on the other hand, may tend to increase the particle size. In both cases the products do not possess the desired pigment properties.

The present invention is based upon the discovery that if water be added to a titanium solution undergoing hydrolysis, according to the methods herein set forth, the yield of hydrous titanium oxides may be increased to over 95% and even as high as 98% while at the same time avoiding the harmful effects of continued boiling.

The addition of water may be carried out in several ways all of which are embraced within the scope of the invention. Two procedures are given by way of illustration.

(1) Water may be added continuously to a titanium sulfate or chloride solution during the hydrolysis. According to this method of procedure the water should be added at a rate and in an amount to maintain, at a substantially constant value, the concentration of acid free and combined with titanium. The rate of addition is governed by the rate of precipitation. Thus, for example, if a titanium sulfate solution contains 300 grams per liter of free and combined $H_2SO_4$ and this concentration increases, due to the removal of water from the solution, combined with and occluded by the precipitate, at a rate of 2 grams per liter over a given period of time during the initial stages of hydrolysis and at a rate of approximately 1 gram per liter during the final stages, it will be necessary, in order to maintain substantially constant acid concentration, to add during the initial stages about 7.0 ccs. of water and during the final stages about 3.5 ccs. in the course of the time interval corresponding to the rate of increase.

(2) Water may be added to a titanium sulfate or chloride solution after the major part, for instance 80%, of the titanium has been precipitated. The amount of water to be added according to this method should be roughly an amount sufficient to reduce the acid concentration to substantially that of the original solution and may be added at one time. However, the amount may vary within certain limits, say from 10–20 volume-percent based on the volume of the titanium sulfate solution to be treated. In practicing the invention according to this method, the precaution should be taken of interrupting the hydrolysis, by discontinuing the heating, during the addition of the water. We have found that if the solution is kept at the boiling point during the addition of the water, the remainder of the precipitate will assume an undesirable form possessing inferior pigmenting characteristics.

Although these two methods of practicing the invention are preferred for general applications, other methods for adding the water as, for example, adding it in a continuous regular flow (compare for instance Example No. 2) or in equal increments throughout the hydrolysis, may be employed without departing from the scope of the invention. It will be seen that by treating a hydrolizing titanium solution with water according to any procedure embraced by the present invention, the final concentration of acid, free and combined with titanium, after the titanium has been practically completely precipitated does not substantially differ from the acid concentration of the solution, free and combined with titanium, prior to any precipitation of titanium. It is desirable, no matter what the procedure be for practicing the invention, not to add an excessive amount of water since we have found that if the acid concentration is materially decreased the precipitate tends to assume undesirable characteristics. In adding the water to the titanium solution to be treated any suitable means may be employed as, for example, by flowing it into the hydrolizing solution from a tank located above the precipitation vessel. When adding the water the titanium solution should be agitated in order to bring out, as rapidly as possible, a thorough and complete mixing of the water and titanium solution. We have found that it is convenient to add water at room temperature; however, if desired, the water may be added at an elevated temperature.

The methods of the present invention involving the addition of water to a titanium solution in which precipitation through thermal hydrolytic decomposition has sufficiently progressed, are clearly distinguished from prior art methods involving the addition of nuclei to act as initiators and accelerators for the hydrolytic decomposition of titanium solutions and are not to be confused with such nucleating processes.

According to one such method a layer of cold water or a dilute titanium solution is placed upon a heated titanium solution and the solution is further heated in order to precipitate titanium hydroxide. By the addition of the water according to this method, titanium compounds are said to be diffused throughout the titanium solution. These diffused titanium compounds are then said to react as nuclei during the thermal hydrolysis of the solution. No control of volume and acid concentration as embodied in our invention is contemplated by such nucleating processes. Moreover, in order to accomplish this diffusion of titanium compounds, it is essential that the admixture of water and titanium solution be effected slowly so that a certain time interval elapses during which the titanium compounds are formed. On the contrary, we have found that efficient agitating in order to secure rapid and thorough mixing is desirable when operating our invention.

Nor is the present invention related to the old analytical practice wherein titanium solutions were extremely diluted in order to obtain quantitative precipitation of the titanium content on boiling. Such methods are not economically feasible and what is of still greater importance do not yield products having any of the desired pigmenting properties. Such dilution was made prior to precipitation and no attempt was made to control the acid concentration.

Our invention is characterized by the controlled addition during the hydrolytic precipitation of hydrous titanium compounds from titanium salt solutions of only a sufficient amount of water to maintain at a substantially constant value the acid content, free and combined with titanium. It is thus also distinguished from uneconomical and impractical processes which involve or suggest the control only of the free acid value by the addition of large quantities of water.

It has also been suggested to maintain a constant concentration of titanium in a hydrolizing solution by continuous addition of a titanium solution to the one which is being hydrolyzed by heating or boiling. In this process the acid concentration increase per unit volume is due, not only to the removal of titanium from the initial or hydrolizing solution, but also due to the removal of titanium from the titanium solution which is being continuously added. This increase in acid concentration per unit volume continues until equilibrium between the inflowing titanium solution and the outflowing mother liquor is reached.

The improved results obtained from the practice of the present invention are related to the condition of physico-chemical equilibrium which exists between the various components of a hydrolyzable titanium solution. Titanium solutions, such as that of the sulfate are said to exist in a meta-stable condition. That is to say, a titanium sulfate solution does not contain in solution a single titanium sulfate of definite composition but is composed of many different compounds of sulfuric acid and titanium such as various basic or acid sulfates present in the solution in varying degrees of hydration. As hydrolysis progresses accompanied by removal of titanium and combined water, as a precipitate of hydrous titanium oxide, these solutions become more highly acid, i. e. the acid concentration free and combined with titanium increases, the solution tends toward a condition of more or less complete stability so that, as pointed out above, it is ordinarily impossible to precipitate by simple heating, more than 90% of the titanium present.

The present invention is distinguished from prior art in that it is based upon the discovery that titanium solutions undergoing hydrolysis may be prevented from reaching a state of more or less complete equilibrium by means of a controlled addition of water after the hydrolysis has sufficiently progressed to result in a precipitation of hydrous titanium oxides. The prior art processes, on the other hand, are based upon the principle of adding nuclei to initiate and to accelerate the hydrolysis as by furnishing minute centres upon which the hydrous titanium oxides may form. The prior art, however, does not disclose that the diminishing rate of breakdown of the chemical equilibrium of hydrolizing titanium solutions resulting from increase in acid concentration free and combined with titanium per unit volume, which takes place regardless of the addition of nuclei, can be counteracted by the addition of water in the manner of the present invention.

Although this explanation is regarded to be the basis for the present invention, its scope is not to be limited in any way thereby.

The invention is further illustrated by the following examples without being restricted thereto:

Example 1

A titanium sulfate solution was first prepared by decomposing ilmenite with strong sulfuric acid in the manner described in U. S. patent Nos. 1,333,819 and 1,333,849. This solution contained 215 grams per liter of $TiO_2$, 345 grams per liter of $H_2SO_4$ combined with titanium, 80 grams per liter of Fe and had a specific gravity of 1.60. 15 cbm. of this solution were heated to boiling and there maintained for four hours. The heating was then discontinued and 1.8 cbm. of water were added to the solution while agitating. The solution was again brought to boiling and heated at this temperature for an additional hour. The yield was 97% of the titanium original present in the solution.

Example 2

10 cbm. of a titanium solution obtained as described in Example 1 and having a similar composition were heated to boiling. After hydrolytic decomposition of the solution had commenced, agitation of the solution was begun and water was gradually added to the solution at a continuous uniform rate of flow. The rate of flow was adjusted so that upon completion of the hydrolysis after about 4–5 hours boiling, 1.2 cbm. of water had been added. The yield of titanium-oxygen compounds thus obtained was about 96% of the titanium originally present in the solution.

Example 3

1175 gallons of titanium solution containing 225 grams per liter of $TiO_2$, 50 grams per liter of Fe in the form of $FeSO_4$ and 440 grams per litre of $H_2SO$ combined with titanium were heated to 95–98° C. in a 2,300 gallon tank of 11.5 feet diameter and a layer of cold water was placed on the top in quantity corresponding to about 20% of its volume. This amount of water is sufficient to reduce the total $H_2SO_4$ content to about 367 grams per liter. The mixture of the liquor was then boiled to effect precipitation, the foregoing being in accordance with prior art procedure.

At the end of each of four hourly periods the total volume in the tank was increased 3½ inches by the addition of water, thus maintaining a substantially constant content of acid, free and combined with titanium. By the end of five hours, the yield of hydrous titanium oxide was about 97%.

It will be appreciated that the rate of addition and the amount of water to be added to a titanium solution of a given composition according to the present invention cannot be arbitrarily fixed, a priori, because the amount and the rate of increase of free and combining acid will vary with different hydrolysis conditions, for instance, the dimensions of the hydrolysis vessel, rate of temperature, increase of hydrolysis solution, temperature and pressure under which the hydrolysis is carried out, rate of precipitation of hydrous titanium oxides, etc. However, from the instruction herein given those skilled in this art will be readily able to determine these factors by means of simple experimentation.

Although, as pointed out above, the methods of the present invention are distinct from processes involving the formation of nuclei they may, nevertheless, be used in conjunction with titanium solutions in which nuclei are present acting as accelerators for the hydrolytic precipitation of hydrous titanium oxides. They may likewise be used in conjunction with methods for accelerating hydrolysis such as, for example, treating the solution with a chemical reagent in order to facilitate the breakdown of metastability resulting from the subsequent thermal hydrolysis. Furthermore, the methods of the present invention are adaptable for use in connection with processes designed to produce composite pigments such as processes in which an extender, for instance, barium sulfate or calcium sulfate, is added to a titanium solution prior to or during hydrolysis in order to obtain a composite precipitate of titanium-oxygen compounds and extender.

The foregoing detailed description has been given for clearness of understanding and no undue limitations are to be deduced therefrom but the appended claims should be construed as broadly as possible in view of the prior art. In the description and claims we have used the term "acid concentration free and combined with titanium" to signify the concentration of acid which exists as free acid + acid combined with titanium.

We claim:—

1. A method for the preparation of hydrous titanium oxides by thermal hydrolytic precipitation from a titanium salt solution which comprises continuously, during the precipitation, adding water to a titanium salt solution after hydrolysis has sufficiently progressed to result in precipitation of hydrous titanium oxides, said water being added in an amount and at a rate of addition sufficient to maintain the acid concentration free and combined with titanium within the hydrolizing solution at a substantially constant value, said value being substantially that of the solution just prior to hydrolysis.

2. A method for the preparation of hydrous titanium oxide by thermal hydrolytic precipitation from a titanium salt solution which comprises continuously, during the precipitation, adding water to a titanium salt solution after hydrolysis has sufficiently progressed to result in precipitation of hydrous titanium oxides, said water being added in an amount and at a rate of addition sufficient to maintain the acid concentration free and combined with titanium within the hydrolizing solution at a substantially constant value said value being substantially that of the solution just prior to hydrolysis while agitating the solution to secure a rapid and complete mixing of the added water and titanium solution.

3. A method for the preparation of hydrous titanium-oxides by thermal hydrolytic precipitation from a titanium salt solution which comprises periodically during the precipitation adding water to a titanium salt solution, after hydrolysis has sufficiently progressed to result in precipitation of hydrous titanium oxides, said water being added in a total amount to produce a final acid concentration free and combined with titanium after completion of the hydrolysis not substantially different from the acid concentration free and combined with titanium prior to hydrolysis.

4. A method for the preparation of hydrous titanium oxides by thermal hydrolytic precipitation from a titanium salt solution which comprises adding water to a titanium solution undergoing hydrolytic decomposition after the major part of the titanium contained therein has been precipitated, said water being added in an amount between substantially 10–20 volume percent based on the volume of the titanium salt solution and being sufficient to reduce the acid concentration free and combined with titanium, to substantially that of the original solution.

5. A method for the preparation of hydrous titanium oxides by hydrolytic decomposition from a titanium salt solution which comprises heating the solution until substantially 80% of the titanium has been precipitated, discontinuing the heating, then adding water thereto in an amount between substantially 10–20 volume percent based on the volume of the titanium salt solution and being sufficient to reduce the acid concentration, free and combined with titanium, to substantially that of the original solution and then further heating the solution.

6. A method for the preparation of hydrous titanium oxides by hydrolytic decomposition from a titanium salt solution which comprises heating the solution until substantially 80% of the titanium has been precipitated, discontinuing the heating, then adding water thereto in an amount between substantially 10–20 volume percent based on the volume of the titanium salt solution and being sufficient to reduce the acid concentration free and combined with titanium, to substantially that of the original solution and then further heating the solution while agitating to secure a rapid and complete mixing of the added water and titanium solution.

7. A method for maintaining breakdown of chemical equilibrium in a metastable titanium solution undergoing thermal hydrolysis which comprises adding water to a titanium solution after hydrolysis has sufficiently progressed to result in precipitation of hydrous titanium oxides, said water being added in an amount sufficient to insure that the final acid concentration free and combined with titanium will not differ substantially from the initial acid concentration free and combined with titanium and to prevent said titanium solution from reaching a state of practically complete chemical equilibrium until substantially all of the titanium contained therein has been precipitated.

8. A method for maintaining breakdown of chemical equilibrium in a metastable titanium solution undergoing thermal hydrolysis which comprises adding water to a titanium solution after hydrolysis has sufficiently progressed to result in precipitation of hydrous titanium oxides, and while the solution is being agitated to obtain rapid and complete mixing, said water being added in an amount sufficient to insure that the final acid concentration free and combined with titanium will not differ substantially from the initial acid concentration free and combined with titanium and to prevent said titanium solution from reaching a state of practically complete equilibrium until substantially all of the titanium contained therein has been precipitated.

9. In a method for the preparation of hydrous titanium oxides by thermal hydrolysis of a titanium sulfate solution, the step which consists in adding water to a titanium sulfate solution undergoing hydrolysis after the major part of the titanium content therein has been precipitated and in an amount substantially sufficient to produce a final acid concentration free and combined with titanium after completion of the hydrolysis not substantially different from the initial acid concentration free and combined with titanium prior to hydrolysis.

10. In a method for the preparation of hydrous titanium oxides by thermal hydrolysis of a titanium sulfate solution, the step which consists in adding water to a titanium sulfate solution undergoing hydrolysis after about 80% of the titanium contained therein has been precipitated and in an amount between substantially 10–20 volume percent based on the volume of the titanium sulfate solution and being sufficient to reduce the acid concentration, free and combined with titanium to substantially that of the original solution.

11. In a method for the preparation of hydrous titanium oxides by thermal hydrolysis from a titanium sulfate solution, the step which consists in continually adding water to a titanium sulfate solution undergoing hydrolysis in an amount and at a rate of addition sufficient to maintain at substantially constant value the acid concentration free and combined with titanium of the hydrolizing solution, said value being substantially that of the solution just prior to hydrolysis.

12. A method for the preparation of hydrous titanium oxides by thermal hydrolytic precipitation from a titanium salt solution which comprises adding water to a titanium salt solution after hydrolysis has sufficiently progressed to result in precipitation of hydrous titanium oxides, said water being added in such amount that after the precipitation of hydrous titanium oxides is practically complete, the final acid concentration free and combined with titanium of the solution does not substantially differ from the initial acid concentration free and combined with titanium of the solution prior to initiating the hydrolysis.

PAUL WEISE.
FRIEDRICH RASPE.